(No Model.)

F. A. HINDS.
WATER MOTOR.

No. 344,737. Patented June 29, 1886.

Witnesses:
Wm Lecher
Edward Stanton

Frank A. Hinds.
Inventor
By Louis Bagger & Co.
Attorneys.

N. PETERS, Photo-Lithographer, Washington, D. C.

UNITED STATES PATENT OFFICE.

FRANK A. HINDS, OF WATERTOWN, NEW YORK.

WATER-MOTOR.

SPECIFICATION forming part of Letters Patent No. 344,737, dated June 29, 1886.

Application filed March 29, 1886. Serial No. 196,974. (No model.)

*To all whom it may concern:*

Be it known that I, FRANK A. HINDS, a citizen of the United States, and a resident of Watertown, in the county of Jefferson and State of New York, have invented certain new and useful Improvements in Water-Motors; and I do hereby declare that the following is a full, clear, and exact description of the invention, which will enable others skilled in the art to which it appertains to make and use the same, reference being had to the accompanying drawings, which form a part of this specification.

This invention relates to an improvement in water-engines, or machines for using water under pressure with which to develop power and move machinery.

The object of the invention is to diminish the loss from friction of pistons and cylinders in obtaining mechanical power or motion from water under pressure.

Figure 1:
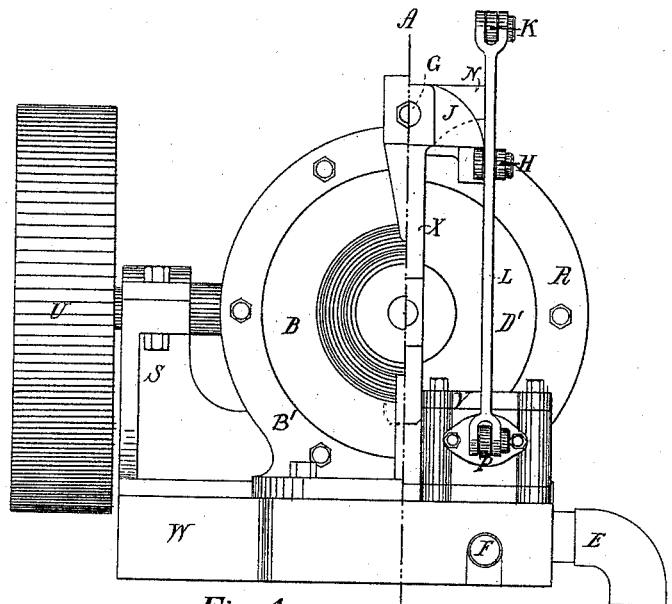
Figure 2:
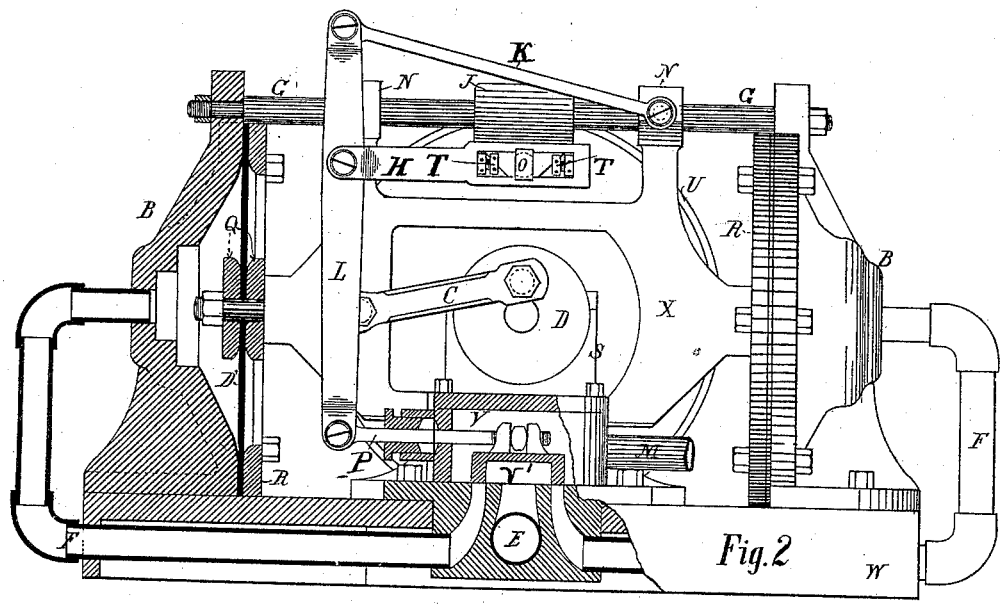

In the accompanying drawings, Figure 1 represents an end view of such a motor with the right-hand side of the nearest end removed, so as to show the details of the farther end. Fig. 2 is a side elevation with the left-hand end in section.

Similar letters refer to similar parts in each figure.

W is a base or bed plate.

B B are two bowl-shaped disks attached one to each end of the bed-plate, with their hollow sides facing each other.

D' is a flexible diaphragm upon the front side of each of the bowl-shaped disks, and held firmly thereto by the metallic rings R, the edge of the ring and face of the bowl-shaped disk next to the flexible diaphragm being rounded so as not to present a sharp corner, as seen in the cross-section in Fig. 2.

X is a yoke or frame, each end of which is secured to the center of the flexible diaphragm, with small circular plates Q with rounded edges protecting it from the nut and shoulder of the frame, as seen in the section in Fig. 2.

D is a crank or disk and shaft, which are supported by the pillow-block S, which carries the fly-wheel or pulley U.

C is a pitman connecting the crank or pin of the crank D with a pin in the frame X.

G is a rod connecting the two bowl-shaped disks at the top. The frame X slides upon this rod in bearings N, which guide it in a true and parallel line, the bottom of the frame being guided by a groove in a block attached to the bed-plate.

F F are inlet-pipes connecting with the inside of each of the bowl-shaped disks behind the diaphragm.

V is a valve-chest with inlet and exhaust ports and a slide-valve, V'.

M is a supply-pipe furnishing water under pressure from the source to the valve-chest.

E is the exhaust-pipe from the valve-chest, which permits the water to pass freely away after it has expended its power through the motor.

L is a valve-lever connected with the valve-rod P and moved by a connecting-rod, K, connecting its upper end with the frame X. The link-bar H, sliding on the fixed pin O, is also attached to the valve-lever at H. The fixed pin O is attached to the block J, which is keyed or firmly bolted to the rod G.

The action of the motor is as follows: The water introduced through the pipe M into the valve-chest V under pressure passes through one of the ports into the pipe F and the chamber of the bowl-shaped disk B behind the diaphragm D', exerting its pressure upon the diaphragm and the metallic plates attaching it to the frame X. The sliding valve admits the water to one end of the machine at the same time that it allows the water from the other end to exhaust through the exhaust-pipe E. This pressure by means of the flexibility of the diaphragms exerts its full power upon the crank D through the frame X and pitman C without the friction incident to the use of a piston. The motion of the valve-lever L, the upper end of which is connected with the frame X, slides the link-bar H along the fixed pin O until it meets one of the adjustable set-screws T at the end of the link, which is so adjusted as to come in contact with the pin O just before the crank D has reached its extreme stroke, so that the remaining motion of the frame X transmitted to the upper end of the valve-lever K throws the valve-rod P in an opposite direction, using the fixed pin O as the fulcrum. This motion shifts the valve and admits the water under pressure to the opposite end of the motor, and permits the exhaust of the water from the end just filled, and the operation is repeated in the opposite direction, revolving the crank D and making the return-stroke. In this manner the power of the water is utilized to produce a rotary motion of the fly-wheel or pulley U, and can be used to operate machinery in any form desired. The slide-valve may be made without lap, the feet just closing the ports, and no more; also, the valve-lever L has its longer arm connected with the valve-rod P and its shorter arm with the frame X, so that the valve V acquires a longer travel than that of the frame X, which produces it according to the ratio of the two arms of the lever L. On account of the inelasticity of the water it is desirable that the valve be moved suddenly and the lap of the valve reduced to a minimum. The flexibility of the diaphragms affords the necessary elasticity to prevent "water-hammer" at the changing of the valve.

Having thus described my invention, I claim and desire to secure by Letters Patent of the United States—

1. The combination of a bed-plate having two facing bowl-shaped disks secured thereto, each of which is provided with a diaphragm secured to its front side, a rod connecting said disks at their top, a reciprocating frame between said disks, having each of its ends secured to one of said diaphragms and its intermediate portion upon said rod, inlet and exhaust pipes having a valve mechanism for opening and closing the same, and means for converting the motion of said reciprocating frame.

2. The combination of a bed-plate having two facing bowl-shaped disks secured thereto, each of said disks being provided with a diaphragm secured to its front side, a rod connecting said disks at their top, a grooved block secured to said bed-plate, a reciprocating frame having bearings at its top upon said rod, a pillow-block, a shaft and crank journaled therein, a pitman connecting said frame and said crank, inlet and exhaust pipes having valve mechanism for opening and closing the same, and a pulley or fly-wheel.

3. The combination of a bed-plate having two facing bowl-shaped disks secured thereto, each of said disks being provided with a diaphragm secured to its front side, a rod connecting said disks at their top, a reciprocating frame secured at its ends to said diaphragms and its intermediate portion upon said rod, inlet and exhaust pipes having a valve mechanism for opening and closing the same, a valve-lever adjustably secured to said rod, one end of which is connected with said valve mechanism and the other to said frame, and means for converting the motion of said frame.

4. The combination of a bed-plate having two facing bowl-shaped disks secured thereto, each of said disks being provided with a diaphragm secured to its front side, a rod connecting said disks at their top, a reciprocating frame between said disks having its ends connected to said diaphragms, inlet and exhaust pipes having a valve mechanism for opening and closing the same, a block rigidly secured upon said rod having a pin secured thereto, a link-bar having set-screws at one end secured upon said pin, and a lever pivotally secured to the other end of said bar, one end of which is secured to the valve mechanism and the other end to said frame.

In testimony that I claim the foregoing as my own I have hereunto affixed my signature in presence of two witnesses.

FRANK A. HINDS.

Witnesses:
CLARENCE A. HOUSE,
FRED AVERY.